US012315298B2

(12) United States Patent
Yang et al.

(10) Patent No.: US 12,315,298 B2
(45) Date of Patent: May 27, 2025

(54) ACTION RECOGNITION METHOD (71) Applicant: SOOCHOW UNIVERSITY, Jiangsu (CN)

(72) Inventors: Jianyu Yang, Jiangsu (CN); Yao Huang, Jiangsu (CN)

(73) Assignee: SOOCHOW UNIVERSITY, Jiangsu (CN)

( * ) Notice: Subject to any disclaimer, the term of this patent is extended or adjusted under 35 U.S.C. 154(b) by 276 days.

(21) Appl. No.: 18/011,602

(22) PCT Filed: Jul. 16, 2021

(86) PCT No.: PCT/CN2021/106694
§ 371 (c)(1),
(2) Date: Dec. 20, 2022

(87) PCT Pub. No.: WO2022/227292
PCT Pub. Date: Nov. 3, 2022

(65) Prior Publication Data
US 2024/0046700 A1    Feb. 8, 2024

(30) Foreign Application Priority Data

Apr. 29, 2021  (CN) .......................... 202110473438.1

(51) Int. Cl.
*G06V 40/20* (2022.01)
*G06V 10/46* (2022.01)
(Continued)

(52) U.S. Cl.
CPC ............ *G06V 40/20* (2022.01); *G06V 10/462* (2022.01); *G06V 10/507* (2022.01);
(Continued)

(58) Field of Classification Search
CPC .... G06V 40/20; G06V 10/462; G06V 10/507; G06V 10/7715; G06V 10/774;
(Continued)

(56) References Cited

U.S. PATENT DOCUMENTS

2021/0150198 A1*  5/2021  Guan ...................... G06T 7/215

FOREIGN PATENT DOCUMENTS

| CN | 108399435 A | 8/2018 |
|---|---|---|
| CN | 110942037 A | 3/2020 |

(Continued)

OTHER PUBLICATIONS

Y. Huang, J. Yang, Z. Shao and Y. Li, "Learning Motion Features from Dynamic Images of Depth Video for Human Action Recognition," 2021 27th International Conference on Mechatronics and Machine Vision in Practice (M2VIP), Shanghai, China, 2021, pp. 258-263, doi: 10.1109/M2VIP49856.2021.9665132. (Year: 2021).*

*Primary Examiner* — Andrew M Moyer
*Assistant Examiner* — Ahmed A Nasher
(74) *Attorney, Agent, or Firm* — NKL LAW; Jae Youn Kim (57) ABSTRACT

The present invention provides an action recognition method, including: segmenting an action video sample, and calculating a dynamic image of each video segment; inputting the dynamic image and a static image of each video segment into a feature extractor; extracting a motion feature vector of the dynamic image; constructing a feature center group to acquire a histogram expression; inputting the histogram expressions into a histogram connecting layer to acquire a complete histogram expression of the action video sample; then, inputting the complete histogram expression into a multilayer perceptron to form a motion feature quantization network; training the motion feature quantization network to converge; inputting the dynamic and static (Continued)

images into a feature extractor, a feature enhancer and a feature soft quantizer in the trained motion feature quantization network to acquire a histogram expression; inputting the histogram expression into a salient motion feature extractor to acquire a salient motion feature map; inputting the salient motion feature map into a convolutional neural network to form an action classifier; training the action classifier to converge; calculating dynamic and static images of each segment of a test action video sample, and inputting the calculated dynamic and static images into the trained action classifier to implement action recognition.

11 Claims, 6 Drawing Sheets

(51) Int. Cl.
*G06V 10/50* (2022.01)
*G06V 10/77* (2022.01)
*G06V 10/774* (2022.01)
*G06V 10/82* (2022.01)
*G06V 20/40* (2022.01)

(52) U.S. Cl.
CPC ........ *G06V 10/7715* (2022.01); *G06V 10/774* (2022.01); *G06V 10/82* (2022.01); *G06V 20/41* (2022.01); *G06V 20/46* (2022.01); *G06V 20/49* (2022.01)

(58) Field of Classification Search
CPC ........ G06V 10/82; G06V 20/41; G06V 20/46; G06V 20/49; G06V 10/56; G06V 20/42; G06V 40/23; G06V 10/50; G06F 18/23; G06F 18/214; G06F 18/24; G06N 3/08; G06N 3/045
See application file for complete search history.

(56) References Cited

FOREIGN PATENT DOCUMENTS

| | | |
|---|---|---|
| CN | 111860353 A | 10/2020 |
| KR | 20160124948 A | 10/2016 |

\* cited by examiner

ACTION RECOGNITION METHOD

TECHNICAL FIELD

The present invention relates to an action recognition method, and belongs to the field of action recognition technologies.

BACKGROUND

Action recognition, as an important subject in the field of computer vision, is widely used in video surveillance, behavior analysis, human-computer interaction and other fields. Although more and more attention has been paid to bone-based action recognition methods due to the development of cheap depth cameras, these methods are limited by an accuracy requirement of the depth cameras. When there is an occlusion problem or a relatively complex action, a predicted position of a bone joint is usually incorrect. Compared with the depth cameras, RGB devices have become more mature, and are more reliable. Therefore, many scholars study action recognition based on an RGB video.

Most of existing methods implement action recognition by extracting image-level features of frames of a video, but these methods do not devote themselves to extracting motion features of actions in the video. However, for analysis of the video, it is very important to acquire dynamic information in the video, and the motion features are important clues to distinguish different actions.

Therefore, an action recognition method is provided aiming at problems of the above action recognition algorithms.

SUMMARY

The present invention aims to solve the problems in the prior art, and the technical solution is as follows.

An action recognition method includes the following steps:

step 1, segmenting an action video sample, and calculating a dynamic image of each video segment;

step 2, inputting the dynamic image and a static image of each video segment into a feature extractor, and acquiring a motion feature map and a static feature map respectively;

step 3, inputting the acquired motion feature map and static feature map into a motion feature enhancer, and extracting a motion feature vector of the dynamic image;

step 4, constructing a feature center group, inputting the motion feature vector of each dynamic image into a feature center of the feature center group, and accumulating all outputs on each feature center to acquire a histogram expression of the dynamic image;

step 5, inputting the histogram expressions of all the dynamic images of each action video sample into a histogram connecting layer to acquire a complete histogram expression of the action video sample;

step 6, inputting the complete histogram expression of the action video sample into a multilayer perceptron to form a motion feature quantization network;

step 7, inputting dynamic images and static images of all training action video samples into the motion feature quantization network, and training the motion feature quantization network to converge;

step 8, inputting the dynamic image and the static image of each video segment of the training action video sample into a feature extractor, a motion feature enhancer and a feature soft quantizer in the trained motion feature quantization network to acquire a histogram expression;

step 9, inputting the histogram expression into a salient motion feature extractor to acquire a salient motion feature map;

step 10, inputting the salient motion feature map into a convolutional neural network to form an action classifier;

step 11, training the action classifier to converge; and step 12, calculating a dynamic image and a static image of each video segment of a test action video sample, and inputting the dynamic image and the static image into the trained action classifier to implement action recognition.

Preferably, each action video sample is composed of all frames in this action video sample, and any action video sample A is calculated by $$A = \{I_t | t \in [1, T]\}$$

wherein t represents a time index, T is a total number of frames of the action video sample A, $I_t \in \mathbb{R}^{R \times C \times 3}$ is a matrix expression of a $t^{th}$ frame image of the action video sample A, R, C and 3 correspond to numbers of rows, columns, and channels of the matrix expression of the $i^{th}$ frame image, respectively, $\mathbb{R}$ represents that a matrix is a real matrix, and each element in $I_t$ represents a pixel value of the $t^{th}$ frame image; and segmenting the action video sample in step 1 includes:

segmenting, using a window with a length of $l_1$, the action video sample A into Y segments by a step length of $l_2$, wherein an $n_1^{th}$ video segment is expressible as:

$$A_{n_1} = \{I_t | t \in [1+(n_1-1) \times l_2, (n_1-1) \times l_1 + l_1]\} = \{I'_{t_1} | t_1 \in [1, l_1]\},$$

wherein $I'_{t_1}$ represents a $t_1^{th}$ frame image in the $A_{n_1}$ video segment, and is also a $(t_1+(n_1-1) \times l_2)^{th}$ frame image $I_{t_1+(n_1-1)l_2}$ of the action video sample A;

calculating a dynamic image of each video segment of the action video sample A by the following way:

for the $n_1^{th}$ video segment $A_{n_1}$ of the action video sample A, firstly, vectorizing each frame image $I'_{t_1}$ of the video segment, namely, connecting all row vectors of three channels of $I'_{t_1}$ to form a new row vector $i_{t_1}$;

calculating an arithmetic square root of each element in a row vector $i_{t_1}$ to acquire a new vector $w_{t_1}$, namely, $$w_{t_1} = \sqrt{i_{t_1}},$$

wherein $\sqrt{i_{t_1}}$ represents an arithmetic square root of each element in the row vector $i_{t_1}$, and $w_{t_1}$ is recorded as a frame vector of a $t_1^{th}$ frame image of the video segment $A_{n_1}$;

calculating a feature vector $V_{t_1}$ of the $t_1^{th}$ frame image of the video segment $A_{n_1}$ by the following way:

$$v_{t_1} = \frac{1}{t_1} \sum_{K=1}^{t_1} w_K,$$

wherein $\Sigma_{K=1}^{t_1} w_K$ represents a sum of frame vectors of a first frame image to the $t_1^{th}$ frame image of the video segment $A_{n_1}$;

calculating a score $B_{t_1}$ of the $t_1^{th}$ frame image of the video segment $A_{n_1}$ by the following equation:

$$B_{t_1} = u^T \cdot v_{t_1},$$

wherein u is a vector with a dimension of $f$, and $f = R \times C \times 3$; $u^T$ represents a transposition of the vector u; $u^T \cdot v_{t_1}$ represents a dot product of a vector acquired after the transposition of the vector u and the feature vector $V_{t_1}$;

calculating a value of the u so that the more later ranked a frame image of the video segment is, the higher a score of the frame image is, that is, the greater the $t_1$ is, the higher the score $B_{t_1}$ is, wherein the u is calculable by a RankSVM method as follows:

$$u = \underset{u}{\mathrm{argmin}}\ E(u),$$

$$E(u) = \frac{\lambda}{2}\|u\|^2 + \frac{2}{l_1(l_1-1)} \times \sum_{i>j} \max\{0, 1 - B_i + B_j\},$$

wherein $$\underset{u}{\mathrm{argmin}} E(u)$$

represents a u that allows a value of $E(u)$ to be minimum, $\lambda$ is a constant, $\|u\|^2$ represents a sum of squares of all elements in the vector u, $B_i$ and $B_j$ represents a score of an $i^{th}$ frame image of the video segment $A_{n_1}$ and a score of a $j^{th}$ frame image of the video segment $A_{n_1}$, respectively, and $\max\{0, 1-B_i+B_j\}$ represents a larger value selected from 0 and $1-B_i+B_j$; and arranging the vector u calculated by the RankSVM into an image form with a same size as $\Gamma_{t_1}$ to acquire $u_{n_1} \in \mathbb{R}^{R \times C \times 3}$, wherein $u_{n_1}$ is called a dynamic image of the $n_1^{th}$ video segment $A_{n_1}$ of the action video sample A, and Y dynamic images are acquirable as the action video sample A is segmented into Y video sample segments.

Further, in step 2, the feature extractor consists of a series of convolution layers and pooling layers; the dynamic image of each video segment in each action video sample is input into the feature extractor, and a feature map output by the feature extractor is $F^M \in \mathbb{R}^{K_1 \times K_2 \times D}$, wherein $K_1$, $K_2$ and D represent a height, a width and a number of channels of the output feature map, respectively, and $F^M$ is called a motion feature map;

for each video segment in each action video sample, an in-between frame of the video segment is extracted as a static image of the video segment of the action video sample; and the static image of each video segment in each action video sample is input into the feature extractor, and a feature map output by the feature extractor is $F^S \in \mathbb{R}^{K_1 \times K_2 \times D}$, wherein $F^S$ is called a static feature map.

Further, inputting the acquired motion feature map and static feature map into the motion feature enhancer and extracting the motion feature vector of the dynamic image in step 3 particularly include:

calculating a sum of pixel values of each channel in the motion feature map $F^M$, wherein a sum $\mu_d$ of pixel values of a $d^{th}$ is calculated as follows:

$$\mu_d = \sum_{a,b} F_d^M(a, b),$$

wherein $F_d^M(\alpha, b)$ represents a value of the d channel in the motion feature map $F^M$ at a position $(\alpha, b)$;

calculating a sum of pixel values of each channel in the static feature map $F^S$, wherein a sum $S_d$ of pixel values of a $d^{th}$ channel is calculated as follows:

$$s_d = \sum_{a,b} F_d^S(a, b),$$

wherein $F_d^S(\alpha, b)$ represents a value of the $d^{th}$ channel in the static feature map $F^S$ at the position $(\alpha, b)$;

calculating a difference between the sum of the pixel values of each channel in the motion feature map $F^M$ and the sum of the pixel values of the corresponding channel in the static feature map $F^S$, wherein a calculation equation of a difference $\beta_d$ between sums of the pixel values of the $d^{th}$ channels is:

$$\beta_d = |S_d - \mu_d|,$$

since the motion feature map and the static feature map are outputs acquired by the same feature extractor, convolution kernels corresponding to the $d^{th}$ channels in the motion feature map and the static feature map are the same; if the difference $\beta_d$ is very small, it means that static features are mostly extracted by the convolution kernels corresponding to the $d^{th}$ channels in the motion feature map and the static feature map, or if the difference $\beta_d$ is relatively large, it means that motion features are mostly extracted by the convolution kernels corresponding to the $d^{th}$ channels in the motion feature map and the static feature map; thus, the larger the difference $\beta_d$ is, the greater a weight of the features extracted by the corresponding convolution kernels is, so that the motion features are enhanced;

a weight $r_d$ of features extracted by the convolution kernels corresponding to the $d^{th}$ channels is calculated by the following equation:

$$r_d = \frac{e^{\beta_d}}{\sum_{\overline{\omega}=1}^{D} e^{\beta_{\overline{\omega}}}},$$

wherein e is a natural constant, and has a value about 2.718281828459045, $\beta_{\overline{\omega}}$ represents a difference between a sum of the pixel values of a $\overline{\omega}^{th}$ channel in the motion feature map and a sum of the pixel values of the $\overline{\omega}^{th}$ channel in the static feature map, a value range of $\overline{\omega}$ is $[1, D]$, and $\overline{\omega}$ is an integer, and multiplying a value of each channel in the motion feature map $F^M$ by the weight of the features of the channel to acquire a new motion feature a $F^{M'} \in \mathbb{R}^{K_1 \times K_2 \times D}$ called an enhanced motion feature map $F^{M'}$, wherein a value $F_d^{M'}(\alpha, b)$ of the $d^{th}$ channel in the enhanced motion feature map $F^{M'}$ at the position $(\alpha, b)$ is calculated by the following equation:

$$F_d^{M'}(\alpha, b) = r_d \times F_d^M(\alpha, b)$$

a total number of pixel points in the enhanced motion feature map $F^{M'}$ is $K_1 \times K_2$, a dimension of a feature vector $x_y$ of each pixel point is D, namely, a number of channels in the enhanced motion feature map, $y = 1, 2, \ldots, K_1 \times K_2$, and a motion feature vector in a final dynamic image is representable by a feature vector set $X = \{x_y | y = 1, 2, \ldots, K_1 \times K_2)\}$.

Further, in step 4, the feature center group totally contains $N_k$ feature centers, each feature center corresponds to a scaling coefficient, and initial values of each feature center and a scaling coefficient thereof are calculated by the following method:

calculating motion feature vectors of dynamic images in video segments of all training action video samples, and clustering all the motion feature vectors, wherein a number of clustered clusters is the same as a number of the feature centers, that is, the number of the clustered clusters is $N_k$, each cluster has a cluster center, a value of a clustered center acquired by clustering is used as an initial value of a feature center, and for a $k^{th}$ cluster, a set of all feature vectors in the cluster is recorded as $E_k$ which contains $N_k$ feature centers:

$$E_k = \{e_1, e_2, \ldots, e_{N_k}\};$$

calculating a Euclidean distance $d_{q,\tau}$ between feature vectors:

$$d_{q,\tau} = \Sigma_{d=1}^{D}([e_q]_d - [e_\tau]_d)^2,$$

wherein $[e_q]_d$ represents $d^{th}$ dimension data of a feature vector $e_q$, $q \in [1, N_{k-1}]$, $\tau \in [q+1, N_k]$, and an initial value of a scaling coefficient $\sigma_k$ of a $k^{th}$ feature center is:

$$\sigma_k = \frac{2}{N_k(N_k-1)} \sum_{q=1}^{N_k-1} \sum_{\tau=q+1}^{N_k} d_{q,\tau};$$

for a motion feature vector $x_y$ of a dynamic image, calculating a distance from the motion feature vector to the $k^{th}$ feature center $c_k$, using the distance as an output of the motion feature vector in the $k^{th}$ feature center $c_k$, wherein the distance is calculated by the following equation:

$$W_k(x_y) = \exp(-\|x_y - c_k\|_2/\sigma_k);$$

normalizing the output acquired by inputting the motion feature vector $x_y$ to the $k^{th}$ feature center:

$$W_k^*(x_y) = \frac{\exp(-\|x_y - c_k\|_2/\sigma_k)}{\sum_{\rho=1}^{N_K} \exp(-\|x_y - c_\rho\|_2/\sigma_\rho)},$$

inputting all motion feature vectors of each dynamic image into each feature center of the feature center group, and accumulating all outputs on each feature center of the feature center group, wherein an accumulated output $h_k^{n_1}$ of the $k^{th}$ feature center is calculated as follows:

$$h_k^{n_1} = \Sigma_{y=1}^{K_1 \times K_2} W_k^*(x_y); \text{ and}$$

connecting accumulated values of all the feature centers together to acquire a histogram expression $H_{n_1}$ of a dynamic image of an $n_1^{th}$ video segment of the action video sample:

$$H_{n_1} = (h_1^{n_1}, h_2^{n_1}, \ldots, h_{N_K}^{n_1}),$$

wherein the feature center group and an accumulation layer that accumulates the outputs of the feature center group constitute the feature soft quantizer, an input of the feature soft quantizer is the motion feature vector of the dynamic image of each video segment in each action video sample, and an output of the feature soft quantizer is the histogram expression of the dynamic image of each video segment.

Further, in step 5, acquiring the complete histogram expression of the action video sample particularly includes:

for each action video sample having a plurality of video segments, acquiring a histogram expression corresponding to a dynamic image of each video segment, inputting the histogram expressions of all the dynamic images into the histogram connecting layer, and connecting the histogram expressions to acquire the complete histogram expression of the action video sample, wherein any action video sample A that is segmented into Y video segments has a complete histogram expression as $H = (H_1, H_2, \ldots, H_Y)$.

Further, in step 6, the complete histogram expression of the action video sample is input into a multilayer perceptron to form a motion feature quantization network, and the motion feature quantization network includes the feature extractor, the motion feature enhancer, the feature soft quantizer, the histogram connecting layer and the multilayer perceptron;

the multilayer perceptron includes an input layer, a hidden layer and an output layer; the input layer is connected with an output of the histogram connecting layer, and an output Input of the input layer is the same as the output H of the histogram connecting layer, namely, Input=H, the input layer totally has $m = N_K \times Y$ neurons; the hidden layer has n neurons which are fully connected with all output units of the input layer, and the output layer of the multilayer perceptron has z neurons, each of which represents an action category; a weight between the input layer and the hidden layer is expressed as $\overline{W}_1 \in \mathbb{R}^{m \times n}$, and a weight between the hidden layer and the output layer is expressed as $\overline{W}_2 \in \mathbb{R}^{n \times z}$.

an output Q of a neuron in the hidden layer is calculated as follows:

$$Q = \phi_{elu}(\overline{W}_1 \cdot H + \theta_Q) \in \mathbb{R}^n,$$

wherein $\phi_{elu}$ is an activation function of elu, and $\theta_Q \in \mathbb{R}^n$ a bias vector of the hidden layer;

an output O of the output layer of the multilayer perceptron is:

$$Q = \phi_{softmax}(\overline{W}_2 \cdot Q + \theta_O) \in \mathbb{R}^z,$$

wherein $\phi_{softmax}$ is an activation function of softmax, and $\theta_O \in \mathbb{R}^z$ is a bias vector of the output layer;

a loss function $L_1$ of the motion feature quantization network is:

$$L_1 = -\sum_{g=1}^{G} \sum_{p=1}^{z} [l_g]_p \log([O_g]_p),$$

wherein $O_9 \in \mathbb{R}^z$ is an output vector of a multilayer perceptron of a $g^{th}$ sample, $l_g \in \mathbb{R}^z$ is an expected output vector of the $g^{th}$ sample, and $p^{th}$ dimension data of $l_g$ is defined as:

$$[l_g]_p = \begin{cases} 1, & \text{if } p = l_g \\ 0, & \text{others} \end{cases},$$

wherein G is a total number of samples, and $l_g$ is a label value of the $g^{th}$ sample.

Further, in step 8, the dynamic image and the static image of each video segment in the training action video sample are input into the feature extractor in the trained motion feature quantization network to acquire a motion feature map and a static feature map; the motion feature map and the static feature map are input into the motion feature enhancer in the trained motion feature quantization network to acquire an enhanced motion feature map $F^{M'}$ of the corresponding video segment of the training action video sample; the enhanced motion feature map $F^{M'}$ contains a motion feature vector $x_y \in \mathbb{R}^D$, and y=1,2, . . . , $K_1 \times K_2$; and the motion feature vector is input into the feature soft quantizer in the trained motion feature quantization network to acquire a corresponding histogram expression $\overline{H}_{n_1} = (\overline{h}_1^{n_1}, \overline{h}_2^{n_1}, \ldots, \overline{h}_{N_K}^{n_1})$, wherein $\overline{h}_k^{n_1}$ represents an accumulated output of a $k^{th}$ feature center in the feature soft quantizer in the trained motion feature quantization network, and k=1,2, . . . ,$N_K$.

Further, inputting the histogram expression into the salient motion feature extractor to acquire the salient motion feature map in step 9 particularly includes the following steps:

selecting $N_M$ maximal values from $\overline{h}_1^{n_1}, \overline{h}_2^{n_1}, \ldots, \overline{h}_{N_K}^{n_1}$, wherein the $N_M$ values have $N_M$ corresponding feature centers;

for the $N_M$ feature centers, calculating a distance between a feature vector of each pixel in the enhanced motion feature map and each feature center, wherein a distance between the feature vector $x_y$ and the $k^{th}$ feature center $c_k$ is calculated by the following equation:

$W_k(x_y) = \exp(-\|x_y - c_k\|^2 / \sigma_k)$; and enabling each feature center to acquire an image by serving the distance as a new pixel value of each pixel, wherein the image is called a salient motion feature image, each pixel value of the salient motion feature image is a distance between a feature vector of a corresponding pixel and the feature center, and $N_M$ salient motion feature images are acquired totally; and stacking the $N_M$ salient motion feature images together according to channels to acquire a salient motion feature map with $N_M$ channels.

Further, in step 10, the action classifier is composed of the feature extractor, the motion feature enhancer and the feature soft quantizer in the trained motion feature quantization network as well as the salient motion feature extractor and the convolutional neural network;

a loss function $L_2$ of the action classifier is:

$$L_2 = -\sum_{g=1}^{G} \sum_{p=1}^{z} [I_g]_p \log([Z_g]_p),$$

wherein $Z_g \in \mathbb{R}^z$ is an output vector of a $g^{th}$ sample, $1_g \in \mathbb{R}^z$ is an expected output vector of the $g^{th}$ sample, and the $p^{th}$ dimension data of $1_g$ is defined as:

$$[I_g]_p = \begin{cases} 1, & \text{if } p = l_g \\ 0, & \text{others} \end{cases},$$

wherein $l_g$ is a label value of the $g^{th}$ sample.

Further, implementing the action recognition in step 12 particularly includes: segmenting, using a window with a length of $l_1$, a test action video sample by a step length of $l_2$, calculating a dynamic image and a static image of each video segment, then, inputting the dynamic image and the static image into the trained action classifier to acquire a predicted probability value representing that the current test action video sample belongs to each action category, adding the output probability values of all the video segments, and using an action category with a greatest probability value as a finally predicted action category to which the current test action video sample belongs.

The motion feature quantization network provided by the present invention can extract pure motion features from motion videos, ignore static information such as a background and an object, and only use the motion features for action recognition, so that the learned motion features are more distinguishable as for the action recognition.

DETAILED DESCRIPTION

The technical solutions in embodiments of the present invention will be clearly and completely described below in conjunction with the accompanying drawings in the embodiments of the present invention. It is obvious that the described embodiments are only part but not all of the embodiments of the present invention. All other embodiments obtained by those skilled in the art without creative efforts based on the embodiments in the present invention are within the protection scope of the present invention.

Figure 1:
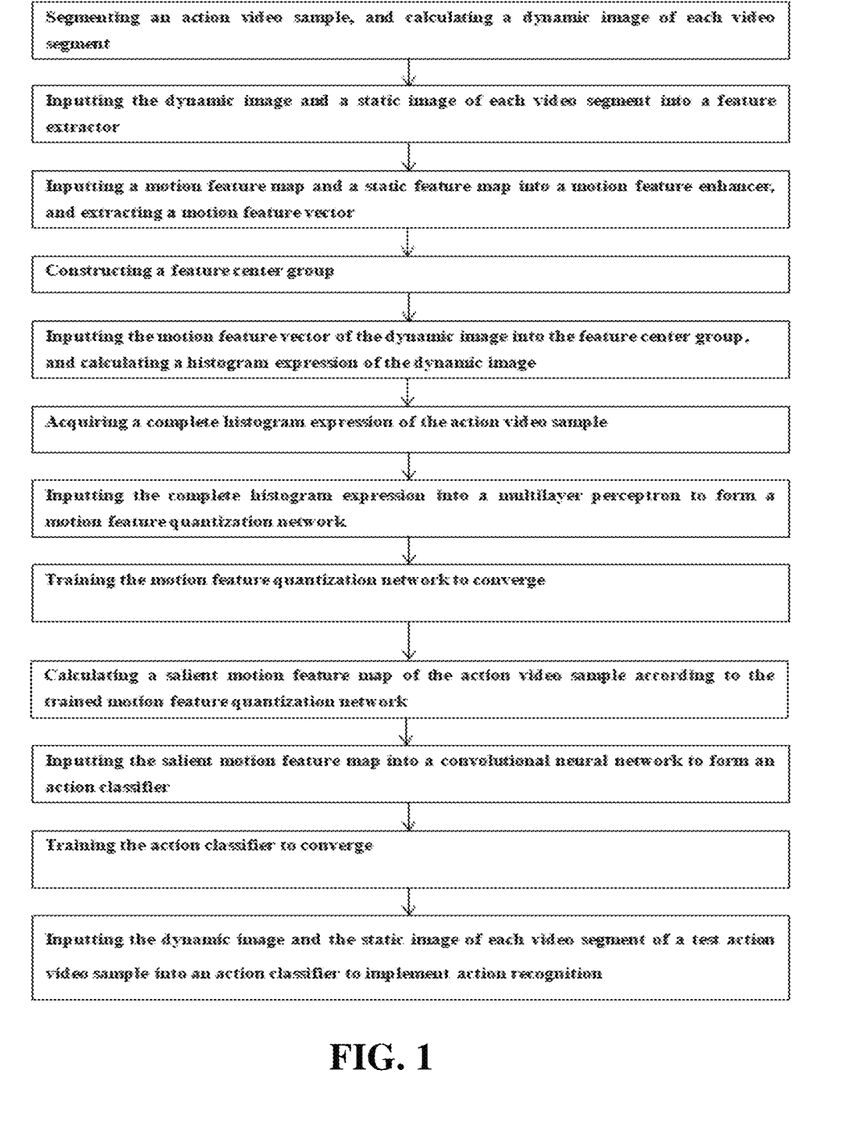
FIG. 1 is an operation flowchart of an action recognition method according to the present invention.

As shown in FIG. 1, an action recognition method includes the following procedures.

1. The total number of samples in an action video sample set is 2,000, and there are 10 action categories, each of which has 200 action video samples. Three-fourths of the samples in each action category are randomly selected to be classified in a training set, and the remaining one-fourth of the samples is classified in a test set, so that 1,500 training action video samples and 500 test action video samples are acquired. Each action video sample is composed of all frames in this action video sample. The first action video sample A is taken as an example:

$A = \{I_t | t \in [1,40]\}$, where t represents a time index, and there are 40 frames in this action video sample. $I_t \in \mathbb{R}^{240 \times 320 \times 3}$ is a matrix expression of the eh frame image of the action video sample A, and the numbers of rows, columns, and channels of the matrix expression of this frame image are 240, 320 and 3, respectively. $\mathbb{R}$ represents that a matrix is a real matrix. Each element in $I_t$ represents a pixel value of the $i^{th}$ frame image. Using a window with a length of 10, the action video sample A is segmented into 5 video segments by a step length of 6. The $n_1^{th}$ video segment $A_{n_1}$ may be expressed as:

$$A_{n_1}=\{I_t | t \in [1+(n_1-1) \times l_2, (n_1-1) \times l_2 + l_1]\} = \{I'_{t_1} | t_1 \in [1, l_1]\},$$

where $I'_{t_1}$ represents the $t_1^{th}$ frame image in the $A_{n_1}$ video segment, and is also the $(t_1+(n_1-1) \times l_2)^{th}$ frame image $I_{t_1}+(n_1-1) \times l_2$ of the action video sample A.

Dynamic images of the five video segments $A_1$, $A_2$, $A_3$, $A_4$, and $A_5$ of the action video sample A are calculated respectively. The video segment $A_2 = \{I_t | t \in [7, 16]\} = \{I'_{t_1} | t_1 \in [1,10]\}$ is taken as an example. Firstly, each frame image $I'_{t_1}$ of the video segment $A_2$ is vectorized, that is, all row vectors of $I'_{t_1}$ are connected to form a new row vector $i_{t_1}$.

An arithmetic square root of each element in the row vector $i_{t_1}$ is calculated to acquire a new vector $w_{t_1}$, namely, $$w_{t_1} = \sqrt{i_{t_1}},$$

where $\sqrt{i_{t_1}}$ represents an arithmetic square root of each element in the row vector $i_{t_1}$, and $w_{t_1}$ is recorded as a frame vector of the $t_1^{th}$ frame image of the video segment $A_2$.

A feature vector $v_{t_1}$ of the $t_1^{th}$ frame image of the video segment $A_2$ is calculated by the following way:

$$v_{t_1} = \frac{1}{10} \sum_{K=1}^{t_1} w_K,$$

where $\sum_{K=1}^{t_1} w_K$ represents a sum of frame vectors of the first frame image to the $t_1^{th}$ frame image of the video segment $A_2$.

A score $B_{t_1}$ of the $t_1^{th}$ frame image of the video segment $A_2$ is calculated by the following equation:

$$B_{t_1} = u^T \cdot v_{t_1},$$

where $u$ is a vector with the dimension of 230,400; $u^T$ represents a transposition of the vector $u$; $u^T \cdot v_{t_1}$ represents a dot product of a vector acquired after the transposition of the vector $u$ and the feature vector $v_{t_1}$.

The value of the $u$ is calculated so that the more later ranked a frame image in the video segment is, the higher a score of the frame image is, that is, the greater the $t_1$ is, the higher the score $B_{t_1}$ is, wherein the $u$ may be calculated by a RankSVM method as follows:

$$u = \underset{u}{\arg\min}\, E(u),$$

$$E(u) = \frac{\lambda}{2} \|u\|^2 + \frac{1}{45} \times \sum_{i>j} \max\{0, 1 - B_i + B_j\},$$

where $$\underset{u}{\arg\min} E(u)$$

represents a $u$ that allows a value of $E(u)$ to be minimum, $\lambda$ is a constant, and $\|U\|^2$ represents a sum of squares of all elements in the vector $u$. $B_i$ and $B_j$ represents a score of the $i^{th}$ frame image of the video segment $A_{n_1}$ and a score of the $j^{th}$ frame image of the video segment $A_{n_1}$, respectively, and $\max\{0, 1-B_i+B_j\}$ represents a larger value selected from 0 and $1-B_i+B_j$.

Figure 2:
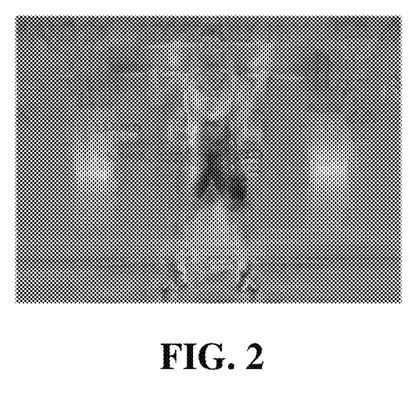
FIG. 2 is a schematic diagram of a dynamic image according to a specific embodiment of the present invention.

The vector $u$ calculated by the RankSVM is arranged into an image form with the same size as $I'_{t_1}$ to acquire $u_2 \in \mathbb{R}^{240 \times 320 \times 3}$, $u_2$ is called a dynamic image of the second video segment $A_2$ of the action video sample A. FIG. 2 shows an example of an acquired dynamic image. 5 dynamic images are acquirable as the action video sample A is segmented into 5 video segments.

Figure 3:
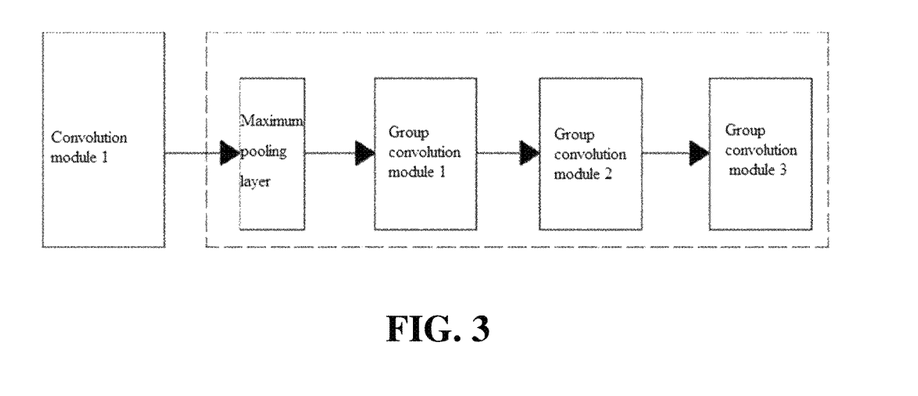
FIG. 3 is a schematic diagram of a feature extractor according to the present invention.
Figure 4:
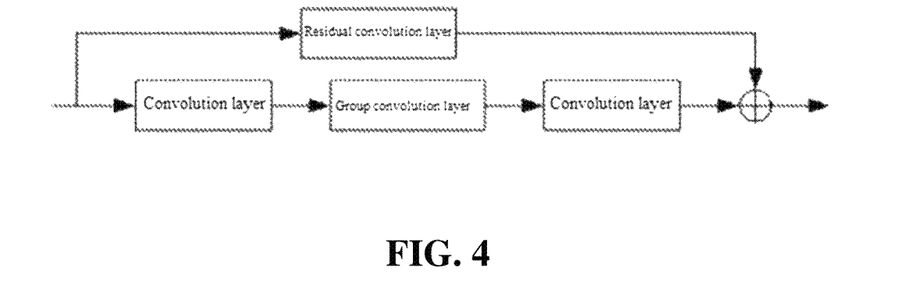
FIG. 4 is a schematic diagram of a group convolution module 1 in FIG. 3.

2. Each dynamic image of the action video sample is input into a feature extractor to extract a motion feature in the dynamic image. The feature extractor consists of a series of convolution layers and pooling layers. As shown in FIG. 3, the feature extractor is composed of the first two modules of ResNext-50, namely, a convolution module 1 and a convolution module The convolution module 1 contains one convolution layer, which has 64 convolution kernels, and the size of each convolution kernel is 7×7. The convolution module 2 contains a maximum pooling layer and three group convolution modules. The size of a pool core of the maximum pooling layer is 3×3. The group convolution module 1 is as shown in FIG. 4: the first layer is a convolution layer, the second layer is a group convolution layer, the third layer is a convolution layer, and the fourth layer is a residual addition layer. The first convolution layer has 128 convolution kernels, each of which has a size of 1×1. The second group convolution layer has 128 convolution kernels, each of which has a size of 3×3. In this group convolution layer, an input feature map with the size of $W^1 \times H^1 \times 128$ is divided into 32 groups of feature maps according to channels, each of which has a size of $W1 \times H^1 \times 4$, and 128 convolution kernels are grouped into 32 groups, each of which has 4 convolution kernels. Each group of the feature maps is convolved with each group of the convolution kernels, respectively. Finally, convolution results of all the groups are connected according to the channels to acquire an output of the group convolution layer. The third convolution layer has 256 convolution kernels, each of which has a size of 1×1. The fourth residual addition layer transfers the input of the first convolution layer into a residual convolution layer.

Figure 5:
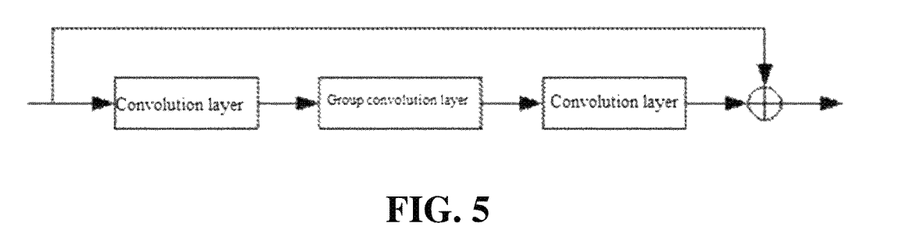
FIG. 5 is a schematic diagram of a group convolution module 2 or a group convolution module 3 in FIG. 3.

The residual convolution layer has 256 convolution kernels, each of which has a size of 1×1. An output of the residual convolution layer and an output of the third convolution layer are added together as an output of the fourth residual addition layer, which is also an output of the group convolution module 1. The group convolution modules 2 and 3 are similar to the group convolution module 1, as shown in FIG. 5, only except that a fourth residual addition layer of each of the group convolution modules 2 and 3 directly adds the input of the first convolution layer and the output of the third convolution layer, and there is no residual convolution layer.

The feature map output by the feature extractor is $F^M \in \mathbb{R}^{30 \times 40 \times 256}$, wherein the height, width and the number of channels of the feature map are 30, 40 and 256, respectively. The feature map $F^M$ is called a motion feature map.

Figure 6:
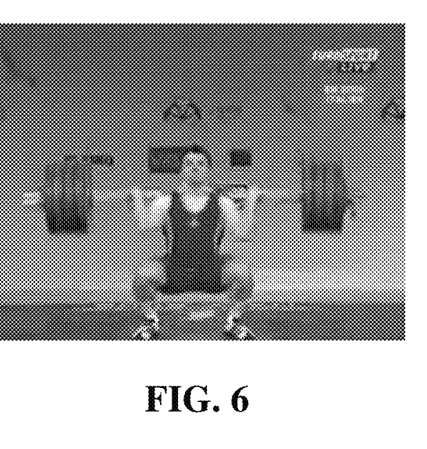
FIG. 6 is a schematic diagram of a static image according to a specific embodiment of the present invention.

3. For each video segment in each action video sample, an in-between frame of the video segment is extracted as a static image of the video segment of the action video sample. FIG. 6 shows a static image of the second video segment $A_2$ of the action video sample A. The static image of each video segment of the action video sample is input into the feature extractor, and a feature map output by the feature extractor is $F^S \in \mathbb{R}^{30 \times 40 \times 256}$, and $F^S$ is called a static feature map.

4. The motion feature map $F^M$ and the static feature map $F^S$ of each video segment of the action video sample are input into a motion feature enhancer. A motion feature vector of the dynamic image is extracted by the following particular steps.

The sum of pixel values of each channel in the motion feature map $F^M$ is calculated, wherein the sum $\mu_d$ of pixel values of the $d^{th}$ channel is calculated as follows:

$$\mu_d = \sum_{a,b} F_d^M(a,b),$$

where $F_d^M(\alpha,b)$ represents a value of the $d^{th}$ channel in the motion feature map $F^M$ at a position $(\alpha, b)$.

The sum of pixel values of each channel in the static feature map $F^S$ is calculated, wherein the sum $S_d$ of pixel values of the $d^{th}$ channel is calculated as follows:

$$s_d = \sum_{a,b} F_d^S(a,b),$$

where $F_d^M(\alpha,b)$ represents a value of the $d^{th}$ channel in the static feature map $F^S$ at the position $(\alpha, b)$.

A difference between the sum of the pixel values of each channel in the motion feature map $F^M$ and the sum of the pixel values of the corresponding channel in the static feature map $F^S$ is calculated, wherein a calculation equation of a difference $\beta_d$ between sums of the pixel values of the $d^{th}$ channels is:

$$\beta_d = |S_d - \mu_d|.$$

Since the motion feature map and the static feature map are outputs acquired by the same feature extractor, convolution kernels corresponding to the $d^{th}$ channels in the motion feature map and the static feature map are the same. If the difference $\beta_d$ is very small, it means that static features, such as background features, are mostly extracted by the convolution kernels corresponding to the $d^{th}$ channels in the motion feature map and the static feature map, or if the difference $\beta_d$ is relatively large, it means that motion features are mostly extracted by the convolution kernels corresponding to the $d^{th}$ channels in the motion feature map and the static feature map. Thus, the larger the difference $\beta_d$ is, the greater a weight of the features extracted by the corresponding convolution kernels is, so that the motion features are enhanced.

A weight $r_d$ of features extracted by the convolution kernels corresponding to the $d^{th}$ channels is calculated by the following equation:

$$r_d = \frac{e^{\beta_d}}{\sum_{\overline{\omega}=1}^{D} e^{\beta_{\overline{\omega}}}},$$

where e is a natural constant, and has a value about 2.718281828459045; $\beta_{\overline{\omega}}$ represents a difference between the sum of the pixel values of a $\overline{\omega}^{th}$ channel in the motion feature map and the sum of the pixel values of the $\overline{\omega}^{th}$ channel in the static feature map; and a value range of $\overline{\omega}^{th}$ is [1, 256], and $\overline{\omega}^{th}$ is an integer. A value of each channel in the motion feature map $F^M$ is multiplied by the weight of the features of the channel to acquire a new motion feature m $F^{M} \in \mathbb{R}^{30 \times 40 \times 256}$ called an enhanced motion feature map. A value $F_d^{M'}(\alpha,b)$ of the $d^{th}$ channel in the enhanced motion feature map $F^{M'}$ at the position $(\alpha, b)$ is calculated by the following equation:

$$F_d^{M'}(\alpha,b) = r_d \times F_d^M(\alpha,b).$$

The total number of pixel points in the enhanced motion feature map $F^{M'}$ is 30×40=1200, a dimension of a feature vector y of each pixel point is 256, namely, the number of channels in the enhanced motion feature map, y=1, 2, . . . ,1200. A motion feature vector in a final dynamic image may be represented by a feature vector set $X=\{x_y|y=1,2,\ldots,1200\}$.

5. A feature center group is constructed, and totally contains 64 feature centers. Each feature center corresponds to a scaling coefficient. The first feature center is taken as an example, and initial values of each feature center and a scaling coefficient thereof are calculated by the following method.

Motion feature vectors of dynamic images in video segments of all training action video samples are calculated, and all the motion feature vectors are clustered. The number of the clustered clusters is set to 64. Each cluster has a cluster center. The value of a clustered center of the first cluster is used as an initial value of a first feature center. A set of all feature vectors in the first cluster is recorded as $E_i$ which contains 500 vectors:

$$E_1 = \{e_1, e_2, \ldots, e_{500}\}.$$

The Euclidean distance $d_{q,\tau}$ between vectors is calculated:

$$d_{q,\tau} = \sqrt{\sum_{d=1}^{256} ([e_q]_d - [e_\tau]_d)^2},$$

where $[e_q]_d$ represents the $d^{th}$ dimension data of a vector $e_q$, $q \in [1, 499]$, and $\tau \in [q+1, 500]$. The initial value of a scaling coefficient $|\sigma_1$ of the first feature center is:

$$\sigma_1 = \frac{1}{124750} \sum_{q=1}^{499} \sum_{\tau=q+1}^{500} d_{q,\tau}.$$

According to the above method, the initial values of 64 feature centers and the initial values of the corresponding scaling coefficients can be acquired.

6. For a motion feature vector $x_y$ of a dynamic image, a distance from this motion feature vector to the $k^{th}$ feature center $c_k$ is calculated, is used as an output of this motion feature vector in the $k^{th}$ feature center $c_k$, and is calculated by the following equation:

$$W_k(x_y) = \exp(-\|x_y - c_k\|_2 / \sigma_k).$$

The output acquired by inputting the motion feature vector $x_y$ to the $k^{th}$ feature center is normalized:

$$W_k^*(x_y) = \frac{\exp(-\|x_y - c_k\|_2 / \sigma_k)}{\sum_{\rho=1}^{64} \exp(-\|x_y - c_\rho\|_2 / \sigma_\rho)}.$$

7. All motion feature vectors of each dynamic image of the action video sample are respectively input to each feature center of the feature center group, and all outputs on each feature center of the feature center group are accumulated. The accumulated output $h_k^{n1}$ of the $k^{th}$ feature center is calculated as follows:

$$h_k^{n1} = \sum_{y=1}^{1200} W_k^*(x_y).$$

The accumulated values of all the feature centers are connected together to acquire a histogram expression $H_{n_1}$ of the dynamic image of the $n_1^{th}$ video segment of the action video sample:

$$H_{n_1}=(h_1^{n_1},h_2^{n_1},\ldots,h_{64}^{n_1}).$$

For the dynamic image $u_2$ of the second video segment $A_2$ of the action video sample A, the calculated histogram expression is $H_2=(h_1^2, h_2^2, \ldots, h_{64}^2)$.

The feature center group and an accumulation layer that accumulates the outputs of the feature center group constitute the feature soft quantizer. The input of the feature soft quantizer is the motion feature vector of the dynamic image of each video segment in each action video sample, and an output of the feature soft quantizer is the histogram expression of the dynamic image of each video segment.

8. For each action video sample, it has a plurality of video segments, a histogram expression corresponding to a dynamic image of each video segment is acquired, and is input into the histogram connecting layer, and the histogram expressions are connected to acquire the complete histogram expression of the action video sample. For the action video sample A, it is segmented into 5 video segments, and its complete histogram expression is:

$$H=(H_1,H_2,\ldots,H_5)=(h_1^1,h_2^1,\ldots,h_{64}^1, h_1^2,h_2^2,\ldots,h_{64}^2,\ldots,h_1^5,h_2^5,\ldots,h_{64}^5).$$

Figure 7:
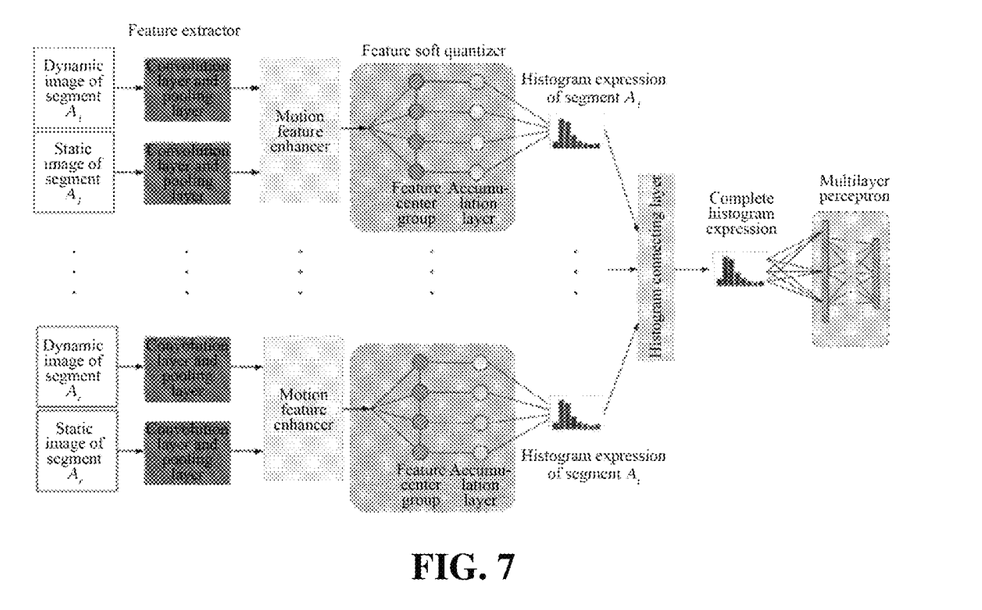
FIG. 7 is a schematic diagram of a motion feature quantization network according to the present invention.

9. The complete histogram expression of the action video sample is input into a multilayer perceptron to form a motion feature quantization network, as shown in FIG. 7. The motion feature quantization network includes the feature extractor, the motion feature enhancer, the feature soft quantizer, the histogram connecting layer and the multilayer perceptron.

The multilayer perceptron includes an input layer, a hidden layer and an output layer. The input layer is connected with an output of the histogram connecting layer, and an output Input of the input layer is the same as that output H of the histogram connecting layer, namely, Input=H. The input layer totally has 320 neurons. The hidden layer totally has 128 neurons which are fully connected with all output units of the input layer. The output layer of the multilayer perceptron has 10 neurons, each of which represents an action category. A weight between the input layer and the hidden layer is expressed $\overline{W}_1 \in \mathbb{R}^{320 \times 128}$, and a weight between the hidden layer and the output layer is expressed as $\overline{W}_2 \in \mathbb{R}^{128 \times 10}$.

An output Q of a neuron in the hidden layer is calculated as follows:

$$Q=\phi_{elu}(\overline{W}_1 \cdot H + \theta_Q) \in \mathbb{R}^{128},$$

where $\phi_{elu}$ is an activation function of elu, and $\theta_Q \in \mathbb{R}^{128}$ is a bias vector of the hidden layer.

An output O of the output layer of the multilayer perceptron is:

$$O=\phi_{softmax}(\overline{W}_2 \cdot Q + \theta_O) \in \mathbb{R}^{10},$$

where $\phi_{softmax}$ is an activation function of softmax, and $\theta_O \in \mathbb{R}^{10}$ is a bias vector of the output layer.

A loss function $L_1$ of the motion feature quantization network is:

$$L_1 = -\sum_{g=1}^{1500}\sum_{p=1}^{10}[l_g]_p \log([O_g]_p),$$

wherein $O_g \in \mathbb{R}^{10}$ is an output vector of a multilayer perceptron of the $g^{th}$ sample, $l_g \in \mathbb{R}^{10}$ is an expected output vector of the $g^{th}$ sample, and the $p^{th}$ dimension data of $l_g$ is defined as:

$$[l_g]_p = \begin{cases} 1, & \text{if } p=l_g \\ 0, & \text{others} \end{cases},$$

where $l_g$ is a label value of the $g^{th}$ sample.

10. The dynamic image and the static image of each video segment of the training action video sample are input into the feature extractor in the trained motion feature quantization network to acquire a motion feature map and a static feature map, respectively. The motion feature map and the static feature map are input into the motion feature enhancer in the trained motion feature quantization network to acquire an enhanced motion feature map of the corresponding video segment of the training action video sample. The enhanced motion feature map of the second video segment $A_2$ of the video sample A is $F^{M'}$, which contains the motion feature vector $x_y \in \mathbb{R}^{256}$ and $y=1, 2, \ldots, 1200$.

The motion feature vector is input into the feature soft quantizer in the trained motion feature quantization network to acquire a corresponding histogram expression $\overline{H}_{n_1}=(\overline{h}_1^{n_1}, \overline{h}_2^{n_1}, \ldots, \overline{h}_{64}^{n_1})$.

For the second segment $A_2$ of the action video sample A, the acquired histogram expression is $\overline{H}_2=(\overline{h}_1^2, \overline{h}_2^2, \ldots, \overline{h}_{64}^2)$.

11. The acquired histogram expression $\overline{H}_{n_1}=(\overline{h}_1^{n_1}, \overline{h}_2^{n_1}, \ldots, \overline{h}_{64}^{n_1})$ is input into a salient motion feature extractor to acquire a salient motion feature map. By taking the second video segment $A_2$ of the action video sample A as an example, acquiring a motion feature image particularly includes:

selecting five maximal values from $\overline{h}_1^2, \overline{h}_2^2, \ldots, \overline{h}_{64}^2$, which are $\overline{h}_2^2, \overline{h}_5^2, \overline{h}_8^2, \overline{h}_{25}^2$, and $\overline{h}_{60}^2$, and the corresponding feature centers are $c_2, c_5, c_8, c_{25}$, and $c_{60}$.

For these five feature centers, the distance between the feature vector of each pixel in the enhanced motion feature map $F^{M'}$ and each feature center is calculated. The distance between the feature vector $x_y$ and the feature center $c_2$ is calculated by the following equation:

$$W_2(x_y)=\exp(-\|x_y-c_2\|_2/\sigma_2).$$

Figure 8:
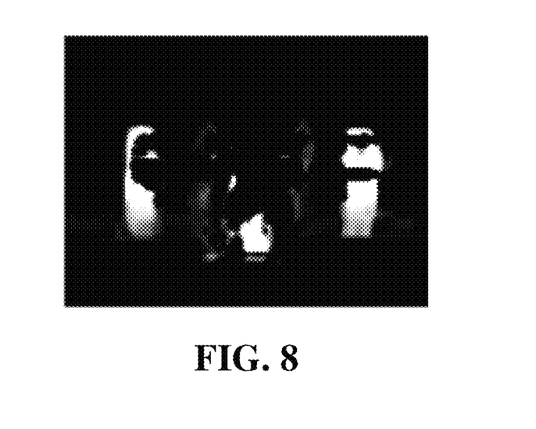
FIG. 8 is a schematic diagram of a salient motion feature image according to a specific embodiment of the present invention.

By using the distance as a new pixel value of each pixel, each feature center can acquire an image which is called a salient motion feature image. Each pixel value of the image is the distance between the feature vector of the corresponding pixel and the feature center. FIG. 8 is a salient motion feature image acquired by calculating the distance between the feature vector of the pixel in the enhanced motion feature image of the second video segment $A_2$ of the action video sample A and the feature center $c_2$.

There are 5 feature centers in total, and 5 salient motion feature images can be acquired. The five acquired salient motion feature images are stacked together according to channels to acquire a salient motion feature map with 5 channels.

Figure 9:
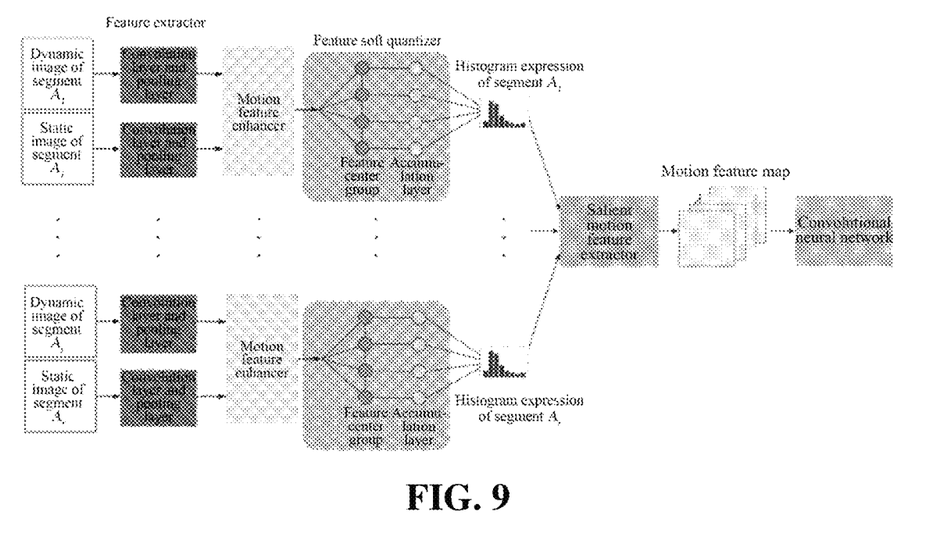
FIG. 9 is a schematic diagram of an action classifier according to the present invention.
Figure 10:
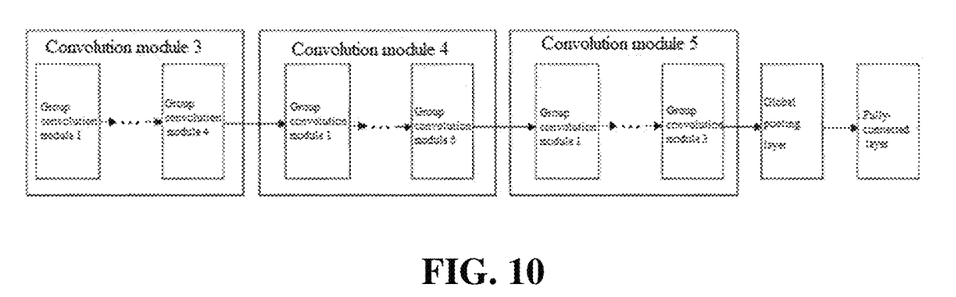
FIG. 10 is a schematic diagram of a convolutional neural network according to the present invention.

12. The salient motion feature map is input into the convolutional neural network to form an action classifier, as shown in FIG. 9. The action classifier is composed of the feature extractor, the motion feature enhancer and the feature soft quantizer in the trained motion feature quantization network as well as the salient motion feature extractor and the convolutional neural network. The convolutional neural network uses remaining modules of ResNext-50, as shown in FIG. 10, including convolution modules 3, 4 and 5, a global pooling layer and a fully-connected layer.

The convolution module 3 contains four group convolution modules. The first layer of the group convolution module 1 is a convolution layer, the second layer thereof is a group convolution layer, the third layer thereof is a convolution layer, and the fourth layer thereof is a residual addition layer. The first convolution layer has 256 convolution kernels, each of which has a size of 1×1. The second group convolution layer has 256 convolution kernels, each of which has a size of 3×3. In this group convolution layer, the input feature map with the size of W×H×256 is divided into 32 groups of feature maps according to channels, each of which has a size of $W^2 \times H^2 \times 8$. The 256 convolution kernels are divided into 32 groups, each of which has 8 convolution kernels. Each group of the feature maps is convolved with each group of the convolution kernels, respectively. Finally, convolution results of all the groups are connected according to the channels to acquire an output of the group convolution layer. The third convolution layer has 512 convolution kernels, each of which has a size of 1×1. The fourth residual addition layer transfers the input of the first convolution layer into the residual convolution layer. The residual convolution layer has 512 convolution kernels, each of which has a size of 1×1. An output of the residual convolution layer and an output of the third convolution layer are added together as an output of the fourth residual addition layer, which is also an output of the group convolution module 1. The group convolution modules 2, 3 and 4 are similar to the group convolution module 1 only except that a fourth residual addition layer of each of the group convolution modules 2, 3 and 4 directly adds the input of the first convolution layer and the output of the third convolution layer, and there is no residual convolution layer.

The convolution module 4 contains six group convolution modules. The first layer of the group convolution module 1 is a convolution layer, the second layer thereof is a group convolution layer, the third layer thereof is a convolution layer, and the fourth layer thereof is a residual addition layer. The first convolution layer has 512 convolution kernels, each of which has a size of 1×1. The second group convolution layer has 512 convolution kernels, each of which has a size of 3×3. In this group convolution layer, the input feature map with the size of $W^3 \times H^3 \times 512$ is divided into 32 groups of feature maps according to channels, each of which has a size of $W \times H^3 \times 16$. The 512 convolution kernels are divided into 32 groups, each of which has 16 convolution kernels. Each group of the feature maps is convolved with each group of the convolution kernels, respectively. Finally, convolution results of all the groups are connected according to the channels to acquire an output of the group convolution layer. The third convolution layer has 1024 convolution kernels, each of which has a size of 1×1. The fourth residual addition layer transfers the input of the first convolution layer into the residual convolution layer. The residual convolution layer has 1024 convolution kernels, each of which has a size of 1×1. An output of the residual convolution layer and an output of the third convolution layer are added together as an output of the fourth residual addition layer, which is also an output of the group convolution module 1. The group convolution modules 2 to 6 are similar to the group convolution module 1 only except that a fourth residual addition layer of each of the group convolution modules 2 to 6 directly adds the input of the first convolution layer and the output of the third convolution layer, and there is no residual convolution layer.

The convolution module 5 contains three group convolution modules. The first layer of the group convolution module 1 is a convolution layer, the second layer thereof is a group convolution layer, the third layer thereof is a convolution layer, and the fourth layer thereof is a residual addition layer. The first convolution layer has 1024 convolution kernels, each of which has a size of 1×1. The second group convolution layer has 1024 convolution kernels, each of which has a size of 3×3. In this group convolution layer, the input feature map with the size of $W^4 \times H^4 \times 1024$ is divided into 32 groups of feature maps according to channels, each of which has a size of $W^4 \times H^4 \times 32$. The 1024 convolution kernels are divided into 32 groups, each of which has 32 convolution kernels. Each group of the feature maps is convolved with each group of the convolution kernels, respectively. Finally, convolution results of all the groups are connected according to the channels to acquire an output of the group convolution layer. The third convolution layer has 2048 convolution kernels, each of which has a size of 1×1. The fourth residual addition layer transfers the input of the first convolution layer into the residual convolution layer. The residual convolution layer has 2048 convolution kernels, each of which has a size of 1×1. An output of the residual convolution layer and an output of the third convolution layer are added together as an output of the fourth residual addition layer, which is also an output of the group convolution module 1. The group convolution modules 2 and 3 are similar to the group convolution module 1 only except that a fourth residual addition layer of each of the group convolution modules 2 and 3 directly adds the input of the first convolution layer and the output of the third convolution layer, and there is no residual convolution layer.

The global average pooling layer calculates an average value of each channel of the feature map input in this layer as the output. An activation function used by the fully-connected layer is softmax.

The loss function $L_2$ of the action classifier is:

$$L_2 = -\sum_{g=1}^{1500} \sum_{p=1}^{10} [l_g]_p \log([Z_g]_p),$$

where $Z_g \in \mathbb{R}^Z$ is an output vector of the fully-connected layer of the $g^{th}$ video sample, $l_g \in \mathbb{R}^Z$ is an expected output vector of the $g^{th}$ video sample, and the $p^{th}$ dimension data is defined as:

$$[l_g]_p = \begin{cases} 1, & \text{if } p = l_g \\ 0, & \text{others} \end{cases},$$

where $l_g$ is a label value of the $g^{th}$ sample.

The input of the action classifier is the dynamic image and the static image of each video segment of the action video sample, and the output thereof is a probability value representing that a current action video sample belongs to each action category. The output probability values of all the video segments are added, and an action category with the greatest probability value is used as a finally predicted action category to which the current action video sample belongs.

13. The action classifier is trained to converge. A window with a length of 10 is used to segment a test action video sample by a step length of 6. A dynamic image and a static image of each video segment are calculated, and then the dynamic image and the static image are input into the trained action classifier to acquire a predicted probability value representing that the current test action video sample belongs to each action category. The output probability values of all the video segments are added, and an action category with the greatest probability value is used as a finally predicted action category to which the current test action video sample belongs.

Although the present invention has been described in detail with reference to the foregoing embodiments, it is still possible for those skilled in the art to modify the technical solutions described in the foregoing embodiments, or equivalently replace some of the technical features therein. Any modifications, equivalent replacements, improvements, etc. made within the spirit and principle of the present invention shall be embraced in the scope of protection of the present invention.

What is claimed is:

1. An action recognition method, comprising the following steps:

step 1, segmenting an action video sample, and calculating a dynamic image of each video segment;

step 2, inputting the dynamic image and a static image of each video segment into a feature extractor, and acquiring a motion feature map and a static feature map respectively;

step 3, inputting the acquired motion feature map and static feature map into a motion feature enhancer, and extracting a motion feature vector of the dynamic image;

step 4, constructing a feature center group, inputting the motion feature vector of each dynamic image into a feature center of the feature center group, and accumulating all outputs on each feature center to acquire a histogram expression of the dynamic image;

step 5, inputting the histogram expressions of all the dynamic images of each action video sample into a histogram connecting layer to acquire a complete histogram expression of the action video sample;

step 6, inputting the complete histogram expression of the action video sample into a multilayer perceptron to form a motion feature quantization network;

step 7, inputting dynamic images and static images of all training action video samples into the motion feature quantization network, and training the motion feature quantization network to converge;

step 8, inputting the dynamic image and the static image of each video segment of the training action video sample into a feature extractor, a motion feature enhancer and a feature soft quantizer in the trained motion feature quantization network to acquire a histogram expression;

step 9, inputting the histogram expression into a salient motion feature extractor to acquire a salient motion feature map;

step 10, inputting the salient motion feature map into a convolutional neural network to form an action classifier;

step 11, training the action classifier to converge; and step 12, calculating a dynamic image and a static image of each video segment of a test action video sample, and inputting the dynamic image and the static image into the trained action classifier to implement action recognition.

2. The action recognition method according to claim 1, wherein each action video sample is composed of all frames in this action video sample, and any action video sample A is calculated by $A=\{I_t|t\in[1,T]\}$ wherein t represents a time index, T is a total number of frames of the action video sample A, $I_t \in \mathbb{R}^{R \times C \times 3}$ is a matrix expression of a $t^{th}$ frame image of the action video sample A, R, C and 3 correspond to numbers of rows, columns, and channels of the matrix expression of the $t^{th}$ frame image, respectively, $\mathbb{R}$ represents that a matrix is a real matrix, and each element in $I_t$ represents a pixel value of the $t^{th}$ frame image; and segmenting the action video sample in step 1 comprises:

segmenting, using a window with a length of $l_1$, the action video sample A into Y segments by a step length of $l_2$, wherein a $n_1^{th}$ video segment A is expressible as:

$A_{n_1} = \{I_t | t \in [1+(n_1+1) \times l_2, (n_1-1) \times l_2 + l_1]\} = \{I'_{t_1} | t_1 \in [1, l_1]\}$, wherein $I'_{t_1}$ represents a $t_1^{th}$ frame image in the video segment $A_{n_1}$, and is also a $(t_1+(n_1-1) \times l_2)^{th}$ frame image $I_{t_1+(n_1-1) \times l_2}$ of the action video sample A;

calculating the dynamic image of each video segment of the action video sample by the following way:

for the $n_1^{th}$ video segment $A_{n_1}$ of any action video sample A, firstly, vectorizing each frame image $I'_{t_1}$ of the video segment, namely, connecting all row vectors of three channels of $I'_{t_1}$ to form a new row vector $i_{t_1}$;

calculating an arithmetic square root of each element in the row vector $i_{t_1}$ to acquire a new vector $w_{t_1}$, namely, $w_{t_1} \leq \sqrt{i_{t_1}}$, wherein $\sqrt{i_{t_1}}$ represents an arithmetic square root of each element in the row vector $i_{t_1}$, and $w_{t_1}$ is recorded as a frame vector of a $t_1^{th}$ frame image of the video segment $A_{n_1}$;

calculating a feature vector $v_{t_1}$ of the $t_1^{th}$ frame image of the video segment $A_{n_1}$ by the following way:

$$v_{t_1} = \frac{1}{t_1} \sum_{k=1}^{t_1} w_k,$$

wherein $\Sigma_{K=3}^{t_1} w_K$ represents a sum of frame vectors of a first frame image to the $t_1^{th}$ frame image of the video segment $A_{n_1}$;

calculating a score $B_{t_1}$ of the $t_1^{th}$ frame image of the video segment $A_{n_1}$ by the following equation:

$B_{t_1} = u^T \cdot v_{t_1}$, wherein u is a vector with a dimension of $f$, and $f = R \times C \times 3$; $u^T$ represents a transposition of the vector u; $u^T \cdot v_{t_1}$ represents a dot product of a vector acquired after the transposition of the vector u and the feature vector $v_{t_1}$;

calculating a value of the u so that the more later ranked a frame image of the video segment is, the higher a score of the frame image is, that is, the greater the $t_1$ is, the higher the score $B_{t_1}$ is, wherein the u is calculable by a RankSVM method as follows:

$u = \underset{u}{\mathrm{argmin}} E(u),$

-continued $$E(u) = \frac{\lambda}{2}\|u\|^2 + \frac{2}{l_1(l_1-1)} \times \sum_{i>j}\max\{0, 1 - B_i + B_j\},$$

wherein $$\operatorname*{argmin}_{u} E(u)$$

represents a u that allows a value of E(u) to be minimum, $\lambda$ is a constant, $\|u\|^2$ represents a sum of squares of all elements in the vector u, $B_i$ and $B_j$ represents a score of an $i^{th}$ frame image of the video segment $A_{n_1}$ and a score of a $j^{th}$ frame image of the video segment $A_{n_1}$, respectively, and max{0, 1−$B_i$+$B_j$} represents a larger value selected from 0 and 1−$B_i$+$B_j$; and arranging the vector u calculated by the RankSVM into an image form with a same size as $\Gamma_{t_1}$ to acquire $u_{n_1} \in \mathbb{R}^{R \times C \times 3}$, wherein $u_{n_1}$ is called a dynamic image of the $n_1^{th}$ video segment $A_{n_1}$ of the action video sample A, and Y dynamic images are acquirable as the action video sample A is segmented into Y video sample segments.

3. The action recognition method according to claim 2, wherein in step 2, the feature extractor consists of a series of convolution layers and pooling layers; the dynamic image of each video segment in each action video sample is input into the feature extractor, and a feature map output by the feature extractor is $F^M \in \mathbb{R}^{K_1 \times K_2 \times D}$, wherein $K_1$, $K_2$ and D represent a height, a width and a number of channels of the output feature map, respectively, and $F^M$ is called the motion feature map;

for each video segment in each action video sample, an in-between frame of the video segment is extracted as a static image of the video segment of the action video sample; and the static image of each video segment in each action video sample is input into the feature extractor, and a feature map output by the feature extractor is $F^S \in \mathbb{R}^{K_1 \times K_2 \times D}$, wherein $F^S$ is called the static feature map.

4. The action recognition method according to claim 3, wherein inputting the acquired motion feature map and static feature map into the motion feature enhancer and extracting the motion feature vector of the dynamic image in step 3 particularly comprise:

calculating a sum of pixel values of each channel in the motion feature map $F^M$, wherein a sum $\mu_d$ of pixel values of a $d^{th}$ channel is calculated as follows:

$$\mu_d = \sum_{a,b} F_d^M(a,b),$$

wherein $F_d^M(\alpha,b)$ represents a value of the $d^{th}$ channel in the motion feature map $F^M$ at a position ($\alpha$, b);

calculating a sum of pixel values of each channel in the static feature map $F^S$, wherein a sum $S_d$ of pixel values of the $d^{th}$ channel is calculated as follows:

$$s_d = \sum_{a,b} F_d^S(a,b),$$

wherein $F_d^S(\alpha,b)$ represents a value of the $d^{th}$ channel in the static feature map $F^S$ at the position ($\alpha$, b);

calculating a difference between the sum of the pixel values of each channel in the motion feature map $F^M$ and the sum of the pixel values of the corresponding channel in the static feature map $F^S$, wherein a calculation equation of a difference $\beta_d$ between sums of the pixel values of the $d^{th}$ channels is:

$$\beta_d = |S_d - \mu_d|,$$

since the motion feature map and the static feature map are outputs acquired by the same feature extractor, convolution kernels corresponding to the $d^{th}$ channels in the motion feature map and the static feature map are the same; if the difference $\beta_d$ is very small, it means that static features are mostly extracted by the convolution kernels corresponding to the $d^{th}$ channels in the motion feature map and the static feature map, or if the difference $\beta_d$ is relatively large, it means that motion features are mostly extracted by the convolution kernels corresponding to the $d^{th}$ channels in the motion feature map and the static feature map; thus, the larger the difference $\beta_d$ is, the greater a weight of the features extracted by the corresponding convolution kernels is, so that the motion features are enhanced;

a weight $r_d$ of features extracted by the convolution kernels corresponding to the $d^{th}$ channels is calculated by the following equation:

$$r_d = \frac{e^{\beta_d}}{\sum_{\bar{\omega}=1}^{D} e^{\beta_{\bar{\omega}}}},$$

wherein e is a natural constant, and has a value about 2.718281828459045, $B_{\bar{\omega}}$ represents a difference between a sum of the pixel values of a $\bar{\omega}^{th}$ channel in the motion feature map and a sum of the pixel values of a $\bar{\omega}^{th}$ channel in the static feature map, a value range of $\bar{\omega}$ is [1,D], and $\bar{\omega}$ is an integer; and multiplying a value of each channel in the motion feature map $F^M$ by the weight of the features of the channel to acquire a new motion feature map $F^{M'} \in \mathbb{R}^{K_1 \times K_2 \times D}$ called an enhanced motion feature map $F^{M'}$, wherein a value $F_d^{M'}(\alpha,b)$ of a $d^{th}$ channel in the enhanced motion feature map $F^{M'}$ at the position ($\alpha$, b) is calculated by the following equation:

$$F_d^{M'}(\alpha,b) = r_d \times F_d^M(\alpha,b),$$

a total number of pixel points in the enhanced motion feature map $F^{M'}$ is $K_1 \times K_2$, a dimension of a feature vector $x_y$ of each pixel point is D, namely, a number of channels in the enhanced motion feature map, y=1,2, . . . , $K_1 \times K_2$, and a motion feature vector in a final dynamic image is representable by a feature vector set X={$x_y$|y=1,2, . . . ,$K_1 \times K_2$}.

5. The action recognition method according to claim 4, wherein in step 4, the feature center group totally contains $N_k$ feature centers, each feature center corresponds to a scaling coefficient, and initial values of each feature center and a scaling coefficient thereof are calculated by the following method:

calculating motion feature vectors of dynamic images in video segments of all training action video samples, and clustering all the motion feature vectors, wherein a number of clustered clusters is the same as a number of the feature centers, that is, the number of the clustered clusters is $N_k$, each cluster has a cluster center, a value of a clustered center acquired by clustering is used as an initial value of a feature center, and for a $k^{th}$ cluster, a set of all feature vectors in the cluster is recorded as $E_k$ which contains $N_k$ feature centers:

$E_k = \{e_1, e_2, \ldots, e_{N_k}\}$;

calculating a Euclidean distance $d_{e,\tau}$ between feature vectors:

$$d_{q,\tau} = \sqrt{\sum_{d=1}^{D}([e_q]_d - [e_\tau]_d)^2},$$

wherein $[e_q]_d$ represents $d^{th}$ dimension data of a feature vector $e_q$, $q \in [1, N_k-1]$, $\tau \in [q+1, N_k]$, and an initial value of a scaling coefficient $\sigma_k$ of a $k^{th}$ feature center is:

$$\sigma_k = \frac{2}{N_k(N_k-1)} \sum_{q=1}^{N_k-1} \sum_{\tau=q+1}^{N_k} d_{q,\tau};$$

for a motion feature vector $x_y$ of a dynamic image, calculating a distance from the motion feature vector to the $k^{th}$ feature center $c_k$, and using the distance as an output of the motion feature vector in the $k^{th}$ feature center $c_k$, wherein the distance is calculated by the following equation:

$W_k(x_y) = \exp(-\|x_y - c_k\|2/\sigma_k)$;

normalizing the output acquired by inputting the motion feature vector $x_y$ to the $k^{th}$ feature center:

$$W_k^*(x_y) = \frac{\exp(-\|x_y - c_k\|_2/\sigma_k)}{\sum_{p=1}^{N_k} \exp(-\|x_y - c_p\|_2/\sigma_p)},$$

inputting all motion feature vectors of each dynamic image into each feature center of the feature center group, and accumulating all outputs on each feature center of the feature center group, wherein an accumulated output $h_k^{n1}$ of the $k^{th}$ feature center is calculated as follows:

$h_k^{n1} = \sum_{y=1}^{K1 \times K2} W_k^*(x_y)$; and connecting accumulated values of all the feature centers together to acquire a histogram expression $H_{n_1}$ of a dynamic image of an $n_1^{th}$ video segment of the action video sample:

$H_{n_1} = (h_1^{n1}, h_2^{n1}, \ldots, h_{N_K}^{n1})$, wherein the feature center group and an accumulation layer that accumulates the outputs of the feature center group constitute the feature soft quantizer, an input of the feature soft quantizer is the motion feature vector of the dynamic image of each video segment in each action video sample, and an output of the feature soft quantizer is the histogram expression of the dynamic image of each video segment.

6. The action recognition method according to claim 5, wherein in step 5, acquiring the complete histogram expression of the action video sample particularly comprises:

for each action video sample having a plurality of video segments, acquiring a histogram expression corresponding to a dynamic image of each video segment, inputting the histogram expressions of all the dynamic images into the histogram connecting layer, and connecting the histogram expressions to acquire the complete histogram expression of the action video sample, wherein any action video sample A that is segmented into Y video segments has a complete histogram expression as $H = (H_1, H_2, \ldots, H_Y)$.

7. The action recognition method according to claim 6, wherein in step 6, the motion feature quantization network comprises the feature extractor, the motion feature enhancer, the feature soft quantizer, the histogram connecting layer and the multilayer perceptron;

the multilayer perceptron comprises an input layer, a hidden layer and an output layer; the input layer is connected with an output of the histogram connecting layer, and an output Input of the input layer is the same as the output H of the histogram connecting layer, namely, Input=H, the input layer totally has $m = N_K \times Y$ neurons; the hidden layer has n neurons which are fully connected with all output units of the input layer, and the output layer of the multilayer perceptron has z neurons, each of which represents an action category; a weight between the input layer and the hidden layer is expressed as $\overline{W}_1 \in \mathbb{R}^{m \times n}$, and a weight between the hidden layer and the output layer is expressed as $\overline{W}_2 \in \mathbb{R}^{n \times z}$;

an output Q of a neuron in the hidden layer is calculated as follows:

$Q = \phi_{elu}(\overline{W}_1 \cdot H + \theta_Q) \in \mathbb{R}^n$, wherein $\phi_{elu}$ is an activation function of elu, and $\theta_Q \in \mathbb{R}^n$ a bias vector of the hidden layer;

an output O of the output layer of the multilayer perceptron is:

$O = \phi_{softmax}(\overline{W}_2 \cdot Q + \theta_O) \in \mathbb{R}^z$, wherein $\phi_{softmax}$ is an activation function of softmax, and $\theta_O \in \mathbb{R}^z$ is a bias vector of the output layer; and a loss function $L_1$ of the motion feature quantization network is:

$$L_1 = -\sum_{g=1}^{G} \sum_{p=1}^{z} [l_g]_p \log([O_g]_p),$$

wherein $O_g \in \mathbb{R}^z$ is an output vector of a multilayer perceptron of a $g^{th}$ sample, $l_g \in \mathbb{R}^z$ an expected output vector of the $g^{th}$ sample, and $p^{th}$ dimension data of $l_g$ is defined as:

$$[l_g]_p = \begin{cases} 1, & \text{if } p = l_g \\ 0, & \text{others} \end{cases},$$

wherein G is a total number of samples, and $l_g$ is a label value of the $g^{th}$ sample.

8. The action recognition method according to claim 7, wherein in step 8, the dynamic image and the static image of each video segment in the training action video sample are input into the feature extractor in the trained motion feature quantization network to acquire a motion feature map and a static feature map; the motion feature map and the static feature map are input into the motion feature enhancer in the trained motion feature quantization network to acquire an enhanced motion feature map $F^{M'}$ of the corresponding video segment of the training action video sample; the enhanced motion feature map $F^{M'}$ contains a motion feature vector $x_y \in \mathbb{R}^D$, and $y=1,2,\ldots,K_1 \times K_2$; and the motion feature vector is input into the feature soft quantizer in the trained motion feature quantization network to acquire a corresponding histogram expression $\overline{H}_{n_1} = (\overline{h}_1^{n_1}, \overline{h}_2^{n_1}, \ldots, \overline{h}_{N_K}^{n_1})$, wherein represents an accumulated output of a $k^{th}$ feature center in the feature soft quantizer in the trained motion feature quantization network, and $k=1, 2, \ldots, N_K$.

9. The action recognition method according to claim 8, wherein inputting the histogram expression into the salient motion feature extractor to acquire the salient motion feature map in step 9 particularly comprises the following steps:
   selecting $N_M$ maximal values from $\overline{h}_1^{n_1}, \overline{h}_2^{n_1}, \ldots, \overline{h}_{N_K}^{n_1}$, wherein the $N_M$ values have $N_M$ corresponding feature centers;
   for the $N_M$ feature centers, calculating a distance between a feature vector of each pixel in the enhanced motion feature map and each feature center, wherein a distance between the feature vector $x_y$ and the $k^{th}$ feature center $c_k$ is calculated by the following equation:
   $W_k(x_y) = \exp(-\|x_y - c_k\|_2 / \sigma_k)$; and
   enabling each feature center to acquire an image by serving the distance as a new pixel value of each pixel, wherein the image is called a salient motion feature image, each pixel value of the salient motion feature image is a distance between a feature vector of a corresponding pixel and the feature center, and $N_M$ salient motion feature images are acquired totally; and stacking the $N_M$ salient motion feature images together according to channels to acquire a salient motion feature map with $N_M$ channels.

10. The action recognition method according to claim 9, wherein in step 10, the action classifier is composed of the feature extractor, the motion feature enhancer and the feature soft quantizer in the trained motion feature quantization network as well as the salient motion feature extractor and the convolutional neural network;
   a loss function $L_2$ of the action classifier is:

$$L_2 = -\sum_{g=1}^{G}\sum_{p=1}^{z}[l_g]_p \log([Z_g]_p),$$

wherein $Z_g \in \mathbb{R}^z$ is an output vector of a $g^{th}$ sample, $l_g \in \mathbb{R}^z$ is an expected output vector of the $g^{th}$ sample, and the $p^{th}$ dimension data of $l_g$ is defined as:

$$[l_g]_p = \begin{cases} 1, & \text{if } p = l_g \\ 0, & \text{others} \end{cases},$$

wherein $l_g$ is a label value of the $g^{th}$ sample.

11. The action recognition method according to claim 10, wherein implementing the action recognition in step 12 particularly comprises:
   segmenting, using a window with a length of $l_1$, a test action video sample by a step length of $l_2$, calculating a dynamic image and a static image of each video segment, then, inputting the dynamic image and the static image into the trained action classifier to acquire a predicted probability value representing that the current test action video sample belongs to each action category, adding the output probability values of all the video segments, and using an action category with a greatest probability value as a finally predicted action category to which the current test action video sample belongs.

\* \* \* \* \*